(12) United States Patent
Gopalan et al.

(10) Patent No.: US 6,665,819 B1
(45) Date of Patent: Dec. 16, 2003

(54) DATA CAPTURE AND ANALYSIS FOR EMBEDDED SYSTEMS

(75) Inventors: Yadhu N. Gopalan, Redmond, WA (US); Xiongjian Fu, Redmond, WA (US); David M. Sauntry, Redmond, WA (US); James A. Stulz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/557,496

(22) Filed: Apr. 24, 2000

(51) Int. Cl.$^7$ .................................................. G06F 11/00
(52) U.S. Cl. ............................. 714/37; 714/33; 716/4
(58) Field of Search ....................... 716/4; 714/37, 714/33; 703/21; 717/135

(56) References Cited

U.S. PATENT DOCUMENTS

| | | | | |
|---|---|---|---|---|
| 5,428,618 A | * | 6/1995 | Ueki et al. ................. | 717/124 |
| 5,615,331 A | * | 3/1997 | Toorians et al. ............... | 714/9 |
| 5,715,387 A | * | 2/1998 | Barnstijn et al. ............. | 714/38 |
| 5,828,824 A | * | 10/1998 | Swoboda ...................... | 714/25 |
| 5,991,897 A | * | 11/1999 | Perugini et al. .............. | 714/27 |
| 6,094,729 A | * | 7/2000 | Mann .......................... | 714/25 |
| 6,389,558 B1 | * | 5/2002 | Herrmann et al. ............ | 714/39 |

* cited by examiner

Primary Examiner—Robert Beausoliel
Assistant Examiner—Christopher S. McCarthy
(74) Attorney, Agent, or Firm—Lee & Hayes, PLLC

(57) ABSTRACT

Data capture and analysis for debugging embedded systems is disclosed. On a target, there is at least one data collector, each of which publishes predetermined data of the target, and a collection manager for managing the data collectors. On a host, there is at least one viewer, each of subscribes to the predetermined data of a data collector, for processing thereof, and a viewer manager for managing the viewers. Data collectors and viewers can be added, such that an extensible data capture and analysis embedded system architecture is provided.

11 Claims, 3 Drawing Sheets

DATA CAPTURE AND ANALYSIS FOR EMBEDDED SYSTEMS

FIELD OF THE INVENTION

This invention relates generally to embedded systems, and more particularly to debugging, profiling, performance-enhancing, optimizing, etc., embedded systems.

BACKGROUND OF THE INVENTION

Embedded systems are the most prevalent of all computer systems used today, accounting for the vast majority of microprocessors sold. Advances in processor technology and memory technology and their associated low cost allow them to be considered for a large number of applications. The size and sophistication of embedded applications has correspondingly grown.

Embedded systems share most of the following characteristics. They generally are developed around custom hardware, require high quality and reliability, and frequently deal with real-time issues. The applications running on these systems can be very large and complex. Examples of such systems include telecommunication switching systems, aircraft, spacecraft, and weapons systems, and a multitude of applications in the car and in the house. Other examples of embedded systems include cellular phones, set-top boxes, and personal-digital assistant (PDA) devices.

Because of their required reliable and often real-time nature, embedded systems generally require careful debugging to ensure that they work as intended. However, debugging embedded systems can be difficult. Usually, developers are required to utilize a wide variety of software tools developed by different vendors in order to solve their problems. Such tools frequently use different mechanisms and protocols for measuring (i.e., collecting) and analyzing data from the target embedded system. Thus, many of these tools are very specialized in purpose, and usually cannot be extended to collect and analyze data other than that for which they were initially developed. This is an inconvenience for the developers, since they may have to use many different tools to debug a single problem in their target embedded systems.

For these and other reasons, therefore, there is a need for the present invention.

SUMMARY OF THE INVENTION

The invention relates to data capture and analysis for debugging embedded systems. In one embodiment, a system Go includes a target and a host. The term "target" non-restrictively and in a non-limiting manner refers to hardware, such as a processor, that is part of an embedded system, and which is desired to be debugged, and/or the software of the embedded system, such as its operating system (OS). The term "host" non-restrictively and in a non-limiting manner refers to a system, such as a desktop computer, to which the target is communicatively coupled for debugging and other purposes. In one embodiment, the target includes at least one data collector, each of which publishes predetermined data of the target, and a collection manager for managing the data collectors. In one embodiment, the host includes at least one viewer, each of which subscribes to the predetermined data of a data collector, for processing thereof, and a viewer manager for managing the viewers. (The phrase predetermined data is used to identify a type of data, that can be identified, for example, by a unique identifier, and is not meant to imply that the data is constant or static.)

Embodiments of the invention provide for advantages not found within the prior art. The use of data collectors and corresponding viewers allows for extensibility of the capture and analysis of embedded system data when debugging. New data collectors, for example, can be added to collect data for the embedded system that is not currently being collected. Similarly, new data viewers can be added to process the collected data (e.g., visualize the data, analyze the data, etc.) in a manner not currently being processed. That is, developers do not have to resort to a multitude of different software tools to debug their embedded system, since embodiments of the invention provide for an extensible data collection and analysis architecture.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
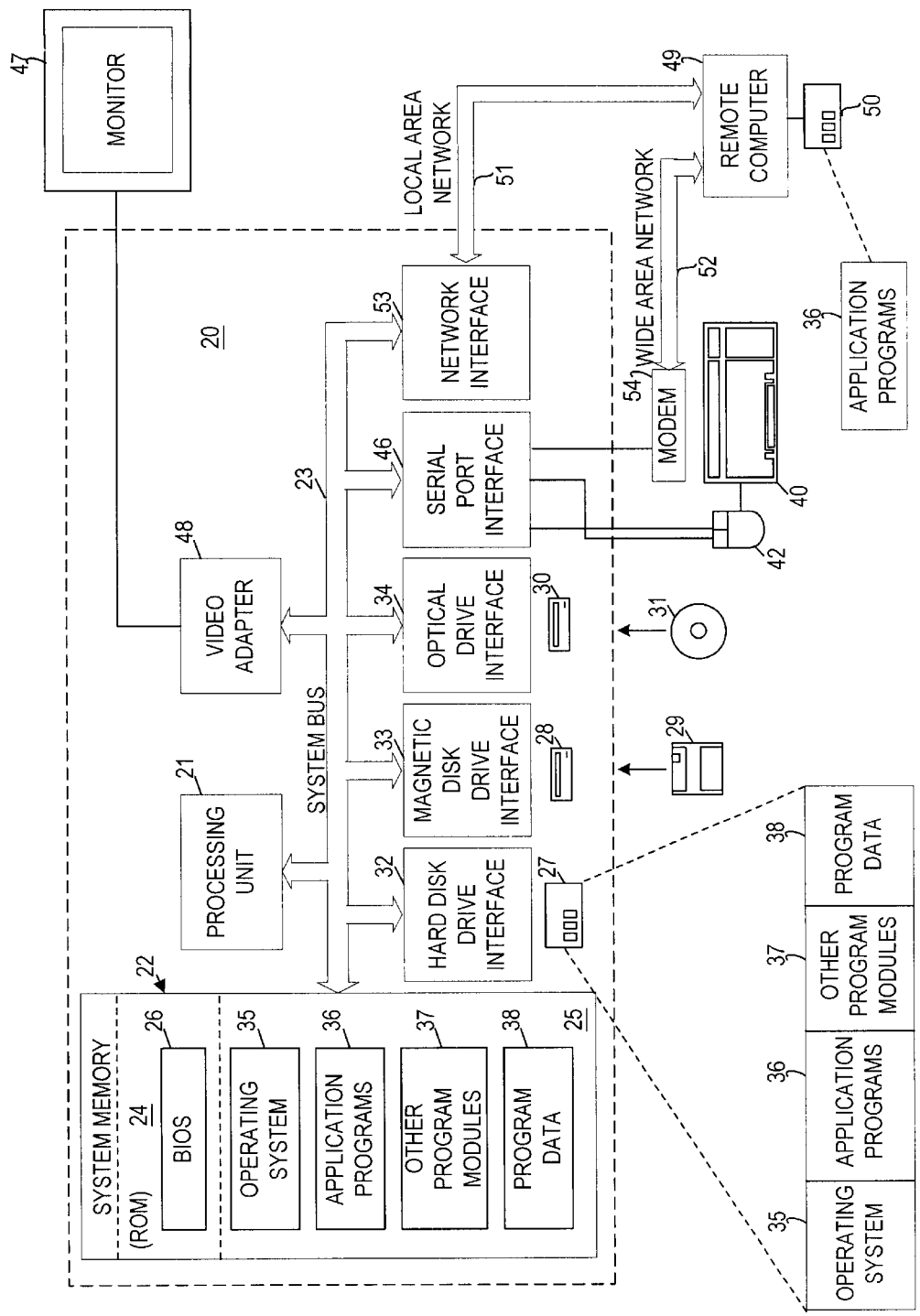
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Systems

Figure 2:
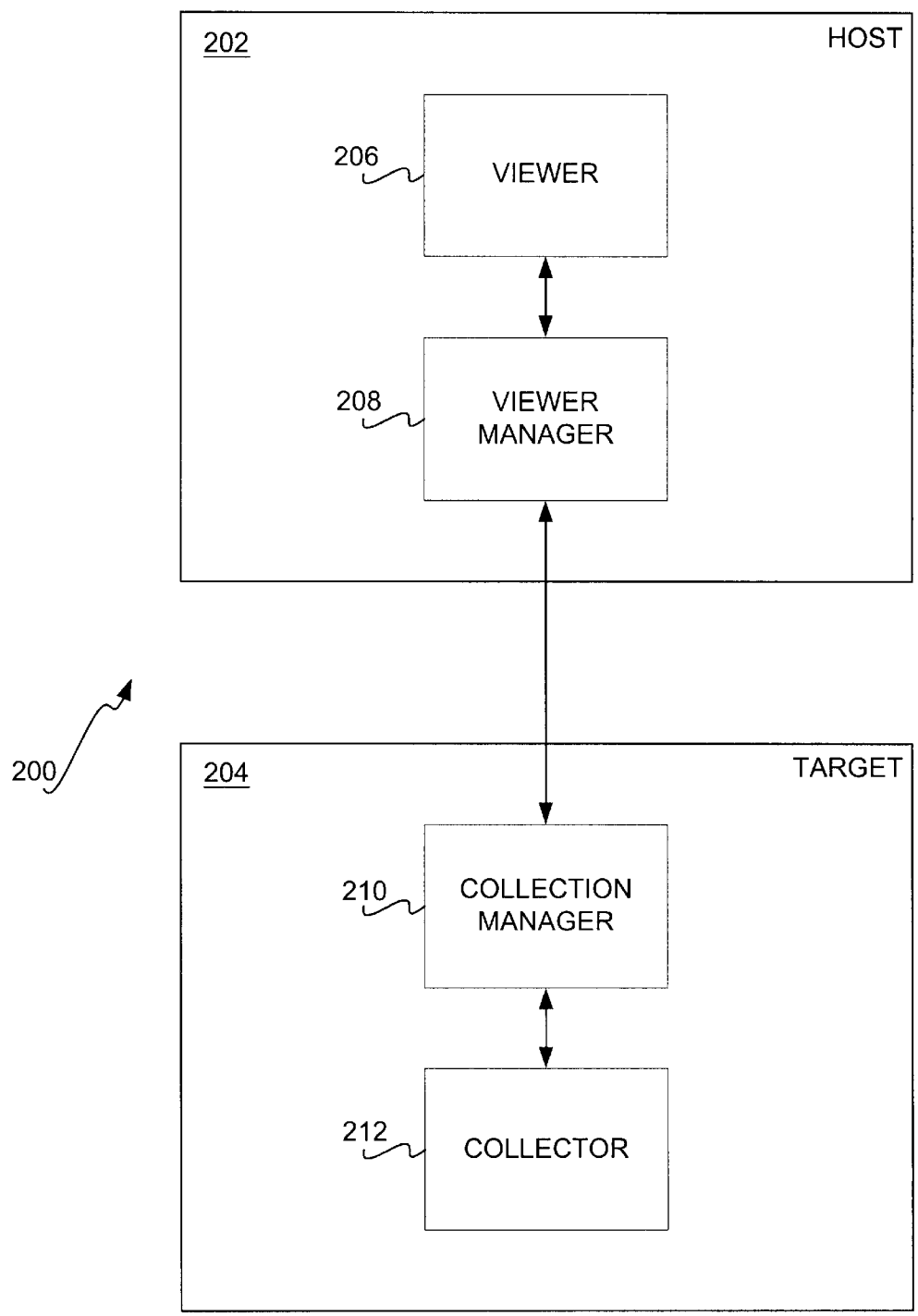
FIG. 2 is a diagram of a system according to an embodiment of the invention; and, FIG. 3 is a flowchart of a method according to an embodiment of the invention.

In this section of the detailed description, systems according to varying embodiments of the invention are described, with reference to FIG. 2, which is a diagram of a system 200 according to one embodiment. The system 200 includes a host 202 and a target 204. The target 204 can in one embodiment correspond to an embedded system being debugged, or components of the embedded system being debugged, such as the hardware of the system, such as a processor, and/or the software of the system, such as an operating system, its kernel, etc. The host 202 is a system to which the target 204 is communicatively coupled for debugging and other purposes, and can be in one embodiment a desktop computer, such as that which was described in the previous section of the detailed description in conjunction with FIG. 1. Thus, each of the host 202 and the target 204 can be considered a system in its own right in one embodiment.

The target 204 includes a collection manager 210 and a data collector 212, as shown in FIG. 2. Although only one data collector is shown, this is for purposes of illustrative clarity only, and there can be and typically are more than one data collector, as can be appreciated by those of ordinary skill within the art. The data collector 212 collects data regarding the target 204 for debugging or other purposes. For example, such data can include memory heap data, synchronization data, etc., as known within the art. The collector 212 transmits the data it collects to the collection manager 210, which manages all the data from the data collectors (and thus, manages all the collectors), for transmission to the host 202 for analysis.

In one embodiment, the collector 212 publishes the data to the manager 210 upon a predetermined event occurring. For example, when a certain address has changed its content, the collector 212 may on the basis of this event take a snapshot of the data within a predetermined range of addresses, and convey this to the manager 210. It is noted that the invention itself is not so limited, however. Thus, each collector within the system is responsible for tracking predetermined data in accordance with predetermined events, where the data and the events of the collectors can be the same or different from one another. For example, one collector may be responsible for tracking a certain range in response to a first event, while a second collector may be responsible for tracking the same in range but in response to a different event.

In one embodiment, each of the collector 212 and the manager 210 is a software component, or object or module, or a computer program. The data gathered by the collector 212 can be of a certain nature pertaining to a particular data type, or other, more abstract classification of information. The collectors exist desirably only to provide data, and desirably perform little or no time-expensive processing on the data before passing it up to the manager 210. The predetermined data collected by the collector 212 can have a structure similar to a data structure in the C++ programming language, as known within the art, and also a unique identifier, such as what is known in the art as a Globally Unique IDentifier (GUID), although the invention is not so limited.

The host 202 includes a data viewer 206 and a viewer manager 208, as shown in FIG. 2. Although only one data viewer is shown, this is for purposes of illustrative clarity only, and there can be and typically are more than one data viewer, as can be appreciated by those of ordinary skill within the art. The data viewer 206 processes the data regarding the target 204, as collected by the collector 212, for debugging and other purposes. For example, such processing can include analysis, transformation, visualization, and other types of processing. A data viewer can in one embodiment abstract and/or transform the data provided to other data, for analysis by a different data viewer (that is, a hierarchy of data viewers can exist). The viewer manager 208 manages the data received from the target 204, and transmits the data to the viewer 206 (or, where there is more than one viewer, to the appropriate viewer).

In one embodiment, the viewer 206 subscribes to the data collected by a particular collector, such as the collector 212. Desirably, the collector 212 only publishes the data if there is a corresponding viewer that has subscribed to the data that is to be collected by this collector. Thus, the collector 212 may have an internal flag indicating that a viewer has subscribed to the data it is collecting. Therefore, in one embodiment, the viewer 206 and the collector 212 can be considered as part of a publish-and-subscribe system, as such are known within the art. Such a system is generally referred to as the providing by a source of information that subscribers select from and then receive on a regular basis or when certain events occur.

In one embodiment, each of the viewer 206 and the viewer manager 208 is a software component, or object or module, or a computer program. The viewers are desirably host-side components that process and represent data ultimately delivered to them from target-side collectors. In one embodiment, viewers register themselves with the viewer manager 208, which can send control data and receive run-time data from the collection manager 210, and its respective collectors. The viewers are responsible for controlling the data streams in one embodiment, via control data ultimately sent to the collectors in one embodiment (i.e., the viewers indicate to a collector that they desire to subscribe to the data collected by the collector). The viewers can also contain and provide a user interface for displaying the data to be viewed. The viewers can also post-process the data as necessary. Examples of processing the data including graphing, transforming, sorting, or statistically manipulating, in addition to those already described. As another example, the data can be stored in a data file.

In one embodiment, the host 202 communicates with the target 204 by the viewer manager 208 of the former communicating with the collection manager 210 of the latter. The host 202 is desirably communicatively coupled to the target 204 via a standard communication link, such as a serial cable, an Ethernet connection, etc. Especially with an Ethernet connection, the collection manager 210 and the viewer manager 208 transmit data to each other in a packetized manner, although the invention itself is not so particularly limited.

Thus, the collection manager 210 acts as a messenger between each collector and the host 202. In one embodiment, there may exist a transport layer at the target 204 through which the collection manager 210 communicates with the host 202. As known within the art, a transport layer is generally a service within a protocol stack that provides end-to-end management of communications sessions. In one embodiment, the manager 210 performs multiplexing of the data sent by the collectors. It is responsible desirably for the creation, destruction, and management of the collectors, for example, as a hierarchy thereof, based on control and status messages received from the viewer manager 208. The behavior of the manager 210 is desirably controlled by the control data received from the host 202 (for example, which can originate by the viewers of the host 202 themselves, as has been described). That is, the collection manager 210 indicates to collectors that viewers desire to subscribe to their data, such that the collectors transmit the data to the collection manager 210, which then transmits the data to the viewer manager 208.

The viewer manager 208 is responsible for providing a communication interface between the viewers and the target 204. In one embodiment, there may exist a transport layer at the host 202 through which the viewer manager 208 communicates with the target 204. The viewer manager 208 in one embodiment passes control data from the viewers to the target 204 (for ultimate delivery to the appropriate collectors), and relays data delivered from the target 204 to the appropriate viewers. The manager 208 also manages the creation and destruction of the viewers (e.g., as in a viewer hierarchy). Because in one embodiment the collectors depend on having corresponding viewers before they will publish any data, the manager 208 in this embodiment also announces each viewer to the collection manager 210 via control data so that the collection manager 210 can notify the appropriate collector.

Thus, when a viewer is first created, it indicates to the viewer manager 208 that it wishes to subscribe to the predetermined data of a given collector. The viewer manager 208 communicates this control data to the collection manager 210, which passes it to the appropriate collector, which may set a flag to indicate that it is now to publish data that it collects. When a predetermined event occurs, the collector collects its predetermined data, and passes it to the collection manager 210, which passes it to the viewer manager 208, which passes it to the viewer that had subscribed to this data. (In one embodiment, there can be buffering of the data before it is sent.) Thus, generally (although the invention is not so limited), the viewer manager 208 passes control data down to the collection manager 210, while the collection manager 210 passes data collected by the collectors up to the viewer manager 208. It is noted that a one-to-one correspondence between viewers and collectors is not necessary—e.g., there may be more than one viewer processing data from one collector, and/or one viewer processing data from many collectors.

Methods

In this section of the detailed description, methods according to varying embodiments of the invention are described. The methods can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

Figure 3:
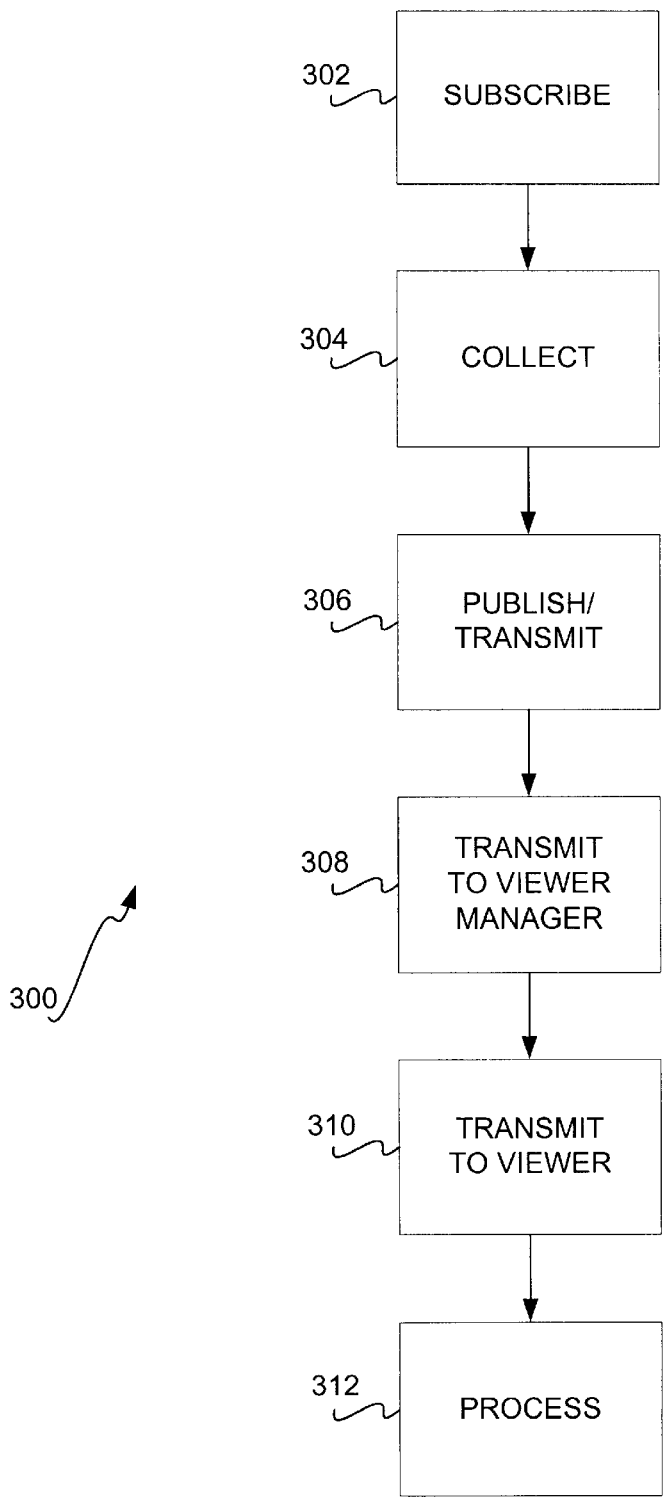

Referring to FIG. 3, a flowchart of a method 300 according to an embodiment of the invention is shown. In 302, a data viewer subscribes to the predetermined data that is collected by a given data collector. That is, the data viewer passes control data indicating its subscription to the viewer manager, which passes the information to the collection manager, which indicates to the data collector that a viewer has subscribed to its data. The data collector may then set an internal flag to indicate that it should publish its data for the viewer.

In 304, upon the occurrence of a predetermined event, or on a regular basis, the data collector collects its predetermined data, and in 306, publishes the data to the collection manager. That is, the collector transmits its data to the collection manager. In 308, the collection manager transmits the data to the viewer manager, for example, over a standard communications link, such as Ethernet or a serial cable. In 310, the viewer manager transmits the data to the viewer or viewers that subscribed to this data. Finally, in 312, the viewer processes the data—for example, analyzing it, or displaying the data for the benefit of the developer.

It is noted that other functionality is covered by the invention than that which is described in conjunction with FIG. 3. As an example, the viewers can control the behavior of the collector via commands. Furthermore, the viewers themselves can publish data for use by other viewers.

Conclusion

It is noted that, although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computerized system for debugging an embedded system comprising:
    a target of the embedded system comprising at least one data collector, each of which publishes predetermined data of the target; and,
    a host for the embedded system comprising at least one viewer, each of which subscribes to the predetermined data of a data collector for processing thereof, wherein the predetermined data comprises one of: memory heap data, and thread synchronization data.

2. The system of claim 1, wherein each viewer is to process the predetermined data at least in part by displaying the predetermined data.

3. A computerized system for debugging an embedded system comprising:
    a target of the embedded system comprising at least one data collector, each of which publishes predetermined data of the target; and,
    a host for the embedded system comprising at least one viewer, each of which subscribes to the predetermined data of a data collector for processing thereof, wherein each viewer is to process the predetermined data at least in part by storing the predetermined data to a file.

4. The system of claim 3, wherein each viewer is further capable of controlling a collector.

5. The system of claim 3, wherein each viewer is further capable of publishing data for other viewers.

6. A host for an embedded system for debugging the embedded system comprising:
    a plurality of viewers, each configured to subscribe to one or more data collect for reception of predetermined data from those one or more collectors;
    each viewer further configured to receive the predetermined data from its subscribed data collectors for processing thereof; and
    a viewer manager configured to manage the plurality of viewer and distribute incoming predetermined data from the one or more data collectors to the viewers that have subscribed to the data incoming from the one or more data collectors, wherein the predetermined data comprises one of: memory heap data, and thread synchronization data.

7. A host for an embedded system for debugging the embedded system comprising:

a plurality of viewers, each configured to subscribe to one or more data collect for reception of predetermined data from those one or more collectors;

each viewer further configured to receive the predetermined data from its subscribed data collectors for processing thereof; and a viewer manager configured to manage the plurality of viewer and distribute incoming predetermined data from the one or more data collectors to the viewers that have subscribed to the data incoming from the one or more data collectors, wherein each viewer is to process the predetermined data at least in part by storing the predetermined data to a file.

8. A target of an embedded system for debugging the embedded system comprising:

more than one data collector configured to track and submit predetermined data of a target of the embedded system;

upon the occurrence of a predetermined event, at least one data collector further configured to submit its tracked predetermined data for publishing to one or more subscribed viewers, the subscribed viewers being those viewers that have subscribed to that data collector for its tracked predetermined data; and a collection manager configured to manage predetermined data submitted by more than one data collector and to publish the submitted predetermined data so that they are conveyed to the subscribed viewers, wherein the predetermined data comprises one of: memory heap data, and thread synchronization data.

9. A target of an embedded system for debugging the embedded system comprising:

more than one data collector configured to track and submit predetermined data of a target of the embedded system;

upon the occurrence of a predetermined event at least one data collector further configured to submit its tracked predetermined data for publishing to one or more subscribed viewers, the subscribed viewers being those viewers that have subscribed to that data collector for its tracked predetermined data; and a collection manager configured to manage predetermined data submitted by more than one data collector and to publish the submitted predetermined data so that they are conveyed to the subscribed viewers, wherein each viewer is to process the predetermined data at least in part by storing the predetermined data to a file.

10. A computer-implemented method for debugging an embedded system having a target thereof and a host therefor comprising:

subscribing by a viewer of the host of to predetermined data of one or more data collector of a plurality of data collectors of the target;

collecting the predetermined data by the plurality of data collectors;

upon the occurrence of a predetermined event, publishing of the predetermined data by one more of the data collectors to a collection manager of the target;

transmitting the predetermined data from the collection of the target to a viewer manager of the host; and, distributing the incoming predetermined data from the viewer manager of the host to the viewers of the host that have subscribed to the incoming data, wherein the predetermined data comprises one of: memory heap data, and thread synchronization data.

11. A computer-implemented method for debugging an embedded system having a target thereof and a host therefore comprising:

collecting predetermined data by a data collector of the target;

upon the occurrence of a predetermined event submitting the predetermined data by the data collector to a collection manager of the target;

transmitting the predetermined data from the collection manager of the target to a viewer manager of the host; and, distributing the incoming predetermined data from the viewer manager of the host to the viewers of the host that have subscribed to the incoming data, wherein the predetermined data comprises one of: memory heap data, and thread synchronization data.

* * * * *

UNITED STATES PATENT AND TRADEMARK OFFICE
CERTIFICATE OF CORRECTION

PATENT NO. : 6,665,819 B1
DATED : December 16, 2003
INVENTOR(S) : Gopalan et al.

It is certified that error appears in the above-identified patent and that said Letters Patent is hereby corrected as shown below:

Title page,
Item [75], Inventor, "James A Stulz", replace "Redmond, WA" with -- Bellevue, WA --.

Column 1,
Line 51, delete "Go" after "system".

Column 8,
Line 61, replace "collector" with -- collectors --.

Column 9,
Line 9, replace "collect" with -- collectors --.

Column 10,
Line 12, replace "therefor" with -- therefore --.
Line 16, replace "collector" with -- collectors --.
Line 23, insert -- manager -- between "collection" and "of".

Signed and Sealed this

Twentieth Day of April, 2004

JON W. DUDAS
*Acting Director of the United States Patent and Trademark Office*